United States Patent
Hiramatsu et al.

(10) Patent No.: US 9,643,652 B2
(45) Date of Patent: May 9, 2017

(54) VEHICLE-BODY STRUCTURE OF AUTOMOTIVE VEHICLE

(71) Applicant: MAZDA MOTOR CORPORATION, Hiroshima (JP)

(72) Inventors: Masaya Hiramatsu, Hiroshima (JP); Yosuke Sawada, Hiroshima (JP); Takashi Hamada, Hiroshima (JP); Soukichi Kikuchi, Higashihiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/996,649

(22) Filed: Jan. 15, 2016

(65) Prior Publication Data

US 2016/0221608 A1 Aug. 4, 2016

(30) Foreign Application Priority Data

Feb. 2, 2015 (JP) ................................ 2015-018380

(51) Int. Cl.
    *B62D 21/15* (2006.01)
    *B62D 25/08* (2006.01)

(52) U.S. Cl.
    CPC ......... *B62D 21/152* (2013.01); *B62D 25/082* (2013.01)

(58) Field of Classification Search
    CPC .......................... B62D 21/152; B62D 25/082
    USPC ..................................................... 296/187.09
    IPC ....................................................... B62D 21/15
    See application file for complete search history.

(56) References Cited

U.S. PATENT DOCUMENTS

| | | | | |
|---|---|---|---|---|
| 8,596,711 B2 * | 12/2013 | Yasui | ...................... | B60R 19/34 |
| | | | | 296/187.09 |
| 9,233,715 B1 * | 1/2016 | Ramoutar | ............ | B62D 25/082 |
| 9,272,679 B1 * | 3/2016 | Ramoutar | ............ | B62D 21/152 |
| 9,290,138 B2 * | 3/2016 | Muraji | ................ | B62D 21/152 |
| 9,381,941 B2 * | 7/2016 | Segawa | ................ | B62D 21/152 |
| 9,399,489 B2 * | 7/2016 | Iwama | ................ | B62D 25/082 |
| 2004/0195862 A1 | 10/2004 | Saeki | | |
| 2012/0248820 A1 | 10/2012 | Yasui et al. | | |
| 2013/0256051 A1 | 10/2013 | Nakamura et al. | | |

FOREIGN PATENT DOCUMENTS

| | | |
|---|---|---|
| JP | 2005-067527 A | 3/2005 |
| JP | 2006-175988 A | 7/2006 |
| JP | 2006-347527 A | 12/2006 |
| JP | 2013-169875 A | 9/2013 |

(Continued)

OTHER PUBLICATIONS

An Office Action; "Notification of Reasons for Refusal," issued by the Japanese Patent Office on Nov. 1, 2016, which corresponds to Japanese Patent Application No. 2015-018380 and is related to U.S. Appl. No. 14/996,649; with English language translation.

*Primary Examiner* — Pinel Romain
(74) *Attorney, Agent, or Firm* — Studebaker & Brackett PC (57) ABSTRACT

A vehicle-body structure of an automotive vehicle comprises a frame which is provided at a side portion of a vehicle body to extend in a vehicle longitudinal direction, and a load absorption portion which is provided at a front face of a tip portion of the frame to protrude forward, wherein the load absorption portion includes an inclination face portion which protrudes outward, in a vehicle width direction, relative to the frame and a tip face of which extends obliquely forward and inward.

15 Claims, 10 Drawing Sheets

(56) References Cited

FOREIGN PATENT DOCUMENTS

JP 2013-212757 A 10/2013
WO WO 2014199718 A1 * 12/2014 ........... B62D 21/152

* cited by examiner

VEHICLE-BODY STRUCTURE OF AUTOMOTIVE VEHICLE

BACKGROUND OF THE INVENTION

The present invention relates to a vehicle-body structure of an automotive vehicle which comprises a frame provided at a side portion of a vehicle body to extend in a vehicle longitudinal direction, such as a front side frame or a rear side frame.

In general, the front side frame or the rear side frame which extends in the vehicle longitudinal direction is provided at the side portion of the vehicle body, and these side frames contribute to ensuring the vehicle-body rigidity and absorbing a collision load.

When a vehicle has a so-called small overlap collision at its front side in which the collision load is not inputted to the front side frame, the collision load is directly inputted to a front pillar of the vehicle, so that a vehicle body may deform greatly.

A vehicle compartment (cabin) is required to be protected properly for ensuring a cabin space. Herein, while there are provided a front pillar, a roof side rail, a side sill, and a door as members for protecting the vehicle compartment against the collision at a vehicle-body side, the door is an openable member and therefore the connectivity of the door is rather low, so that a cabin-protecting structure with the front pillar and the side sill is generally applied.

For example, when the vehicle has an offset collision in which a collision point is located on an outward side, in a vehicle width direction, of the front side frame, like the collision with a small overlap of 25% or less, the sufficient load absorption may not be expected at the front side frame. Therefore, it is desired that a load absorption portion is provided in back of a front end of the front side frame on the outward side, in the vehicle width direction, of the front side frame, or a vehicle body is controlled to be displaced having a lateral slide. In a case of providing the load absorption portion, while it may be considered that the front pillar is set to be thick (big), this thick front pillar may not only increase the weight but deteriorate a front view. This problem may happen to a vehicle-body rear portion as well as the vehicle-body front portion.

Meanwhile, US Patent Application Publication No. 2004/0195862 A1 discloses a structure in which there are provided a pair of side members, each of which has a bifurcated part comprising an outward side portion and an inward side portion, a bumper reinforcement is provided to extend in the vehicle width direction between respective front end portions of the right-and-left side members, and first and second notches are formed at a specified portion of the bifurcated side member, whereby a front end portion of the side member can be controlled to interfere with a powertrain in a vehicle collision, thereby generating a lateral-slide load.

Since the conventional structure disclosed in the above-described patent document is configured to receive the collision load by utilizing blocking of an engine or transmission, the lateral-slide load is generated at the timing the front end portion of the side member which is spaced apart from the powertrain before the vehicle collision comes to contact the powertrain, so that there is a problem that generation of the lateral-slide load may get delayed improperly. Further, since the powertrain is generally connected to the sub frame via a bush, there is another problem that the load transmission may get delayed.

Further, US Patent Application Publication No. 2012/0248820 A1 discloses a structure in which there is provided a branch frame which extends obliquely forward and outward from a middle portion, in the vehicle longitudinal direction, of the front side frame, and the offset-collision load is received, in the vehicle width direction, at a joint portion of the branch frame and the front side frame, thereby generating the lateral-slide load.

However, since the conventional structure disclosed in the second patent document is configured to receive the collision load at the above-described joint portion positioned at the longitudinal-middle portion of the front side frame, there is a problem that the position of the joint portion is located so rearward that the design flexibility may be improperly low.

SUMMARY OF THE INVENTION

Accordingly, an object of the present invention is to provide a vehicle-body structure of an automotive vehicle which can generate the lateral-slide load at the same time as the load absorption in the offset collision, such as the small overlap collision, thereby suppressing improper deformation of the vehicle body, preventing weight increasing.

The present invention is a vehicle-body structure of an automotive vehicle, comprising a frame provided at a side portion of a vehicle body to extend in a vehicle longitudinal direction, and a load absorption portion provided at a front face of a tip portion of the frame to protrude forward, wherein the load absorption portion includes an inclination face portion which protrudes outward, in a vehicle width direction, relative to the frame and a tip face of which extends obliquely forward and inward. Herein, the above-described frame may be set as a longitudinal member, such as a front side frame or a sub frame in a case in which the present invention is applied to a front vehicle-body structure, or a rear side frame in another case in which the present invention is applied to a rear vehicle-body structure.

According to the present invention, since the load absorption portion is configured to include the above-described inclination face portion, when the vehicle has the small overlap collision in which a collision object cannot be received at the front face of the frame, the collision object can be received at the inclination face portion, so that the lateral-slide load can be generated at the same time as the load absorption of the load absorption portion, thereby suppressing improper deformation of the vehicle body, preventing weight increasing.

In an embodiment of the present invention, the load absorption portion, which protrudes forward relative to the tip portion of the frame, is configured such that an edge thereof which is positioned at the front face of the tip portion of the frame extends substantially in the vehicle width direction or obliquely forward and outward.

According to this embodiment, when the collision object hits against the front face of the frame (i.e., in a vehicle frontal or rear collision, not the small overlap collision), the load absorption can be achieved surely without making the load absorption portion laterally slide relatively, thereby ensuring the sufficient amount of load absorption. Meanwhile, in the small overlap collision in which the collision object hits against the inclination face portion, the lateral-slide load can be generated surely.

In another embodiment of the present invention, the load absorption portion comprises a tip-side member and a central-side member, the tip-side member protruding outward relative to the tip portion of the frame and including the inclination face portion, the central-side member being positioned on a central side, in the vehicle longitudinal direction, relative to the tip-side member, provided to protrude outward relative to the frame, and connected to the tip-side member so as to deform inward for load absorption in conjunction with inward deformation of the tip-side member.

According to this embodiment of the present invention, since the load absorption portion comprises the above-described tip-side member and the above-described central-side member, the load absorption is achieved at a larger area of the load absorption portion in the vehicle frontal or rear collision, so that the amount of load absorption can be properly increased without increasing a burden on a vehicle-body central side. Meanwhile, in the small overlap collision, the lateral-slide load can be intensively transmitted to the frame's tip portion by the tip-side member and the central-side member.

In another embodiment of the present invention, the above-described frame is a sub frame connecting right-and-left side frames in the vehicle width direction, and the tip-side member is a sub crash can provided at a tip portion of the sub frame.

According to this embodiment, since the load absorption portion is the sub crash can provided at the tip portion of the sub frame connecting the right-and-left side frames, the lateral-slide load can be generated from the moment the small overlap collision starts, without utilizing the powertrain.

In another embodiment of the present invention, the central-side member comprises a branch member and a vehicle-width-direction load absorption portion, a tip of the branch member and the tip portion of the frame are connected by a connection portion which is deformable in the vehicle width direction, and the vehicle-width-direction load absorption portion is provided separately from the frame on a frame side of a middle portion, in the vehicle longitudinal direction, of the branch member so as to deform in the vehicle width direction for load absorption.

According to this embodiment, the above-described connection portion functions as a support portion of the above-described load absorption portion and the connection portion and the vehicle-width-direction load absorption portion deform in the vehicle width direction for load absorption in the small overlap collision, so that the load-absorption amount is increased and also the collision load is transmitted in the lateral direction without any increase of the collision load transmitted in the longitudinal direction. Consequently, the lateral-slide load can be made to act on the tip portion of the frame having a high rigidity, so that the vehicle body can be made to laterally slide relatively.

In another embodiment of the present invention, the branch member is configured to have a U-shaped cross section opening inward, the vehicle-width-direction load absorption portion is configured to have a U-shaped cross section opening outward, and a closed cross section is formed by the branch member and the vehicle-width-direction load absorption portion.

According to this embodiment, since a structure having the closed cross section is formed by both the branch member and the vehicle-width-direction load absorption portion, these both members can be configured to have a light-weight and high-rigidity structure.

In another embodiment of the present invention, the frame is a sub frame which comprises a cross member portion interconnecting right-and-left side frames in the vehicle width direction, and the vehicle-width-direction load absorption portion is located at a position, in the vehicle width direction, which corresponds to at least one of a side-frame connection portion positioned in front of a vehicle-central-side connection portion of the branch member and the cross member portion.

According to this embodiment, the lateral-slide load can be effectively transmitted to the position located in front of the connection point of the branch member and the frame (the tip portion of the frame), so that the vehicle body can be effectively made to laterally slide relatively via the side-frame connection portion or the cross member.

In another embodiment of the present invention, the load absorption portion is provided with an inclination reinforcement portion which is configured to obliquely extend forward and outward from a tip-end side of the frame.

According to this embodiment, increasing of a proof stress of an inclination direction of the load absorption portion in the small overlap collision is achieved, suppressing improperly-large shape changing of the load absorption portion and the increasing of the proof stress of the vehicle longitudinal direction of the load absorption portion. Additionally, the lateral-slide load is sufficiently transmitted to the tip portion of the frame, thereby surely making the vehicle body laterally slide relatively. Meanwhile, in a normal offset collision, the collision load can be received at the tip portion of the frame via the load absorption portion properly.

In another embodiment of the present invention, the tip-side member comprises an upper panel and a lower panel, and the inclination reinforcement portion comprises an inclination stay which connects the upper and lower panels in a vertical direction.

According to this embodiment, the tip-side member can be configured to have a light-weight and high-rigidity structure.

In another embodiment of the present invention, the tip-side member has an upper face portion, and the inclination reinforcement portion comprises an inclination bead which is formed at the upper face portion of the tip-side member.

According to this embodiment, an oblique-direction proof stress of the tip-side member is increased, whereas an increase of a longitudinal-direction proof stress of the tip-side member is suppressed, thereby properly preventing vehicle body's deformation in a light vehicle collision.

In another embodiment of the present invention, the above-described frame is a sub frame which comprises a cross member portion interconnecting right-and-left side frames in the vehicle width direction, and a rear side, in the vehicle longitudinal direction, of the inclination reinforcement is located at a position, in the vehicle width direction, which corresponds to at least one of a side-frame connection portion and the cross member portion or at a position which is close to the above-described at least one of the side-frame connection portion and the cross member portion.

According to this embodiment, the lateral-slide load can be effectively transmitted and dispersed to the vehicle body via the side-frame connection portion or the cross member portion of the sub frame.

In another embodiment of the present invention, the above-described frame is one of a pair of right-and-left front side frames which are interconnected by a shroud portion which includes a shroud lower and a pair of right-and-left brackets, the above-described tip portion of the frame where the load absorption portion is provided to protrude forward is one of the above-described brackets which are provided to extend downward from respective lower faces of respective front portions of the front side frames, and a rear side, in the vehicle longitudinal direction, of the inclination reinforcement is located at a position, in the vehicle width direction, which corresponds to said shroud lower or at a position which is close to the shroud lower.

According to this embodiment, the lateral-slide load can be effectively transmitted and dispersed to the vehicle-body front portion via the shroud lower and the brackets.

In another embodiment of the present invention, the above-described load absorption portion includes a member which comprises an upper panel and a lower panel and is of a tubal shape extending longitudinally.

According to this embodiment, in the small overlap collision, the lateral-slide load can be transmitted to the frame, suppressing improperly-large shape changing of the load absorption portion for the vehicle frontal collision, thereby surely making the vehicle body laterally slide relatively. Meanwhile, in the normal offset collision, the collision load can be received at the tip portion of the frame via the load absorption portion properly.

Other features, aspects, and advantages of the present invention will become apparent from the following description which refers to the accompanying drawings.

DETAILED DESCRIPTION OF THE INVENTION

Figure 1:
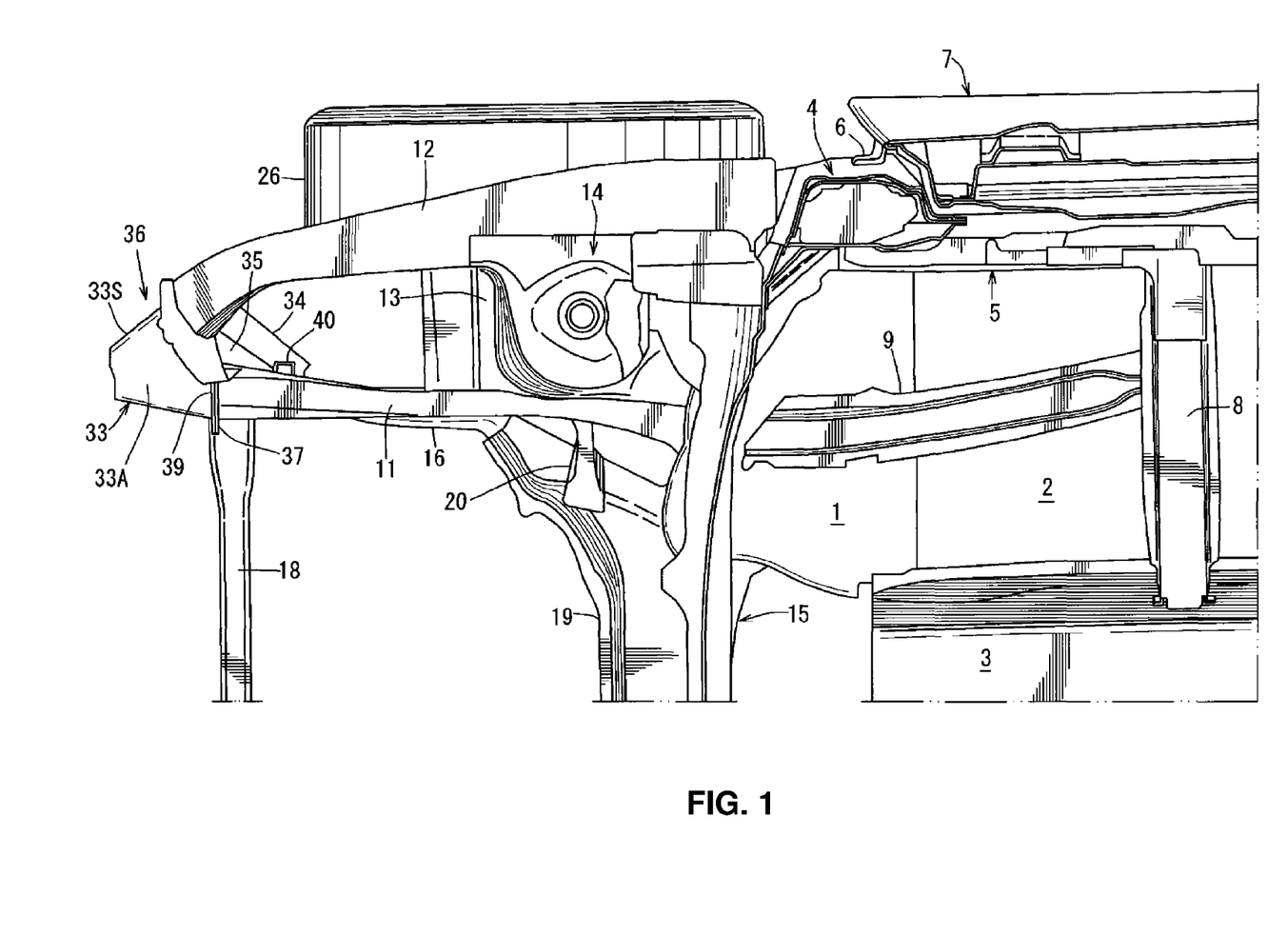
FIG. 1 is a plan view of a vehicle-body structure of an automotive vehicle of the present invention.
Figure 2:
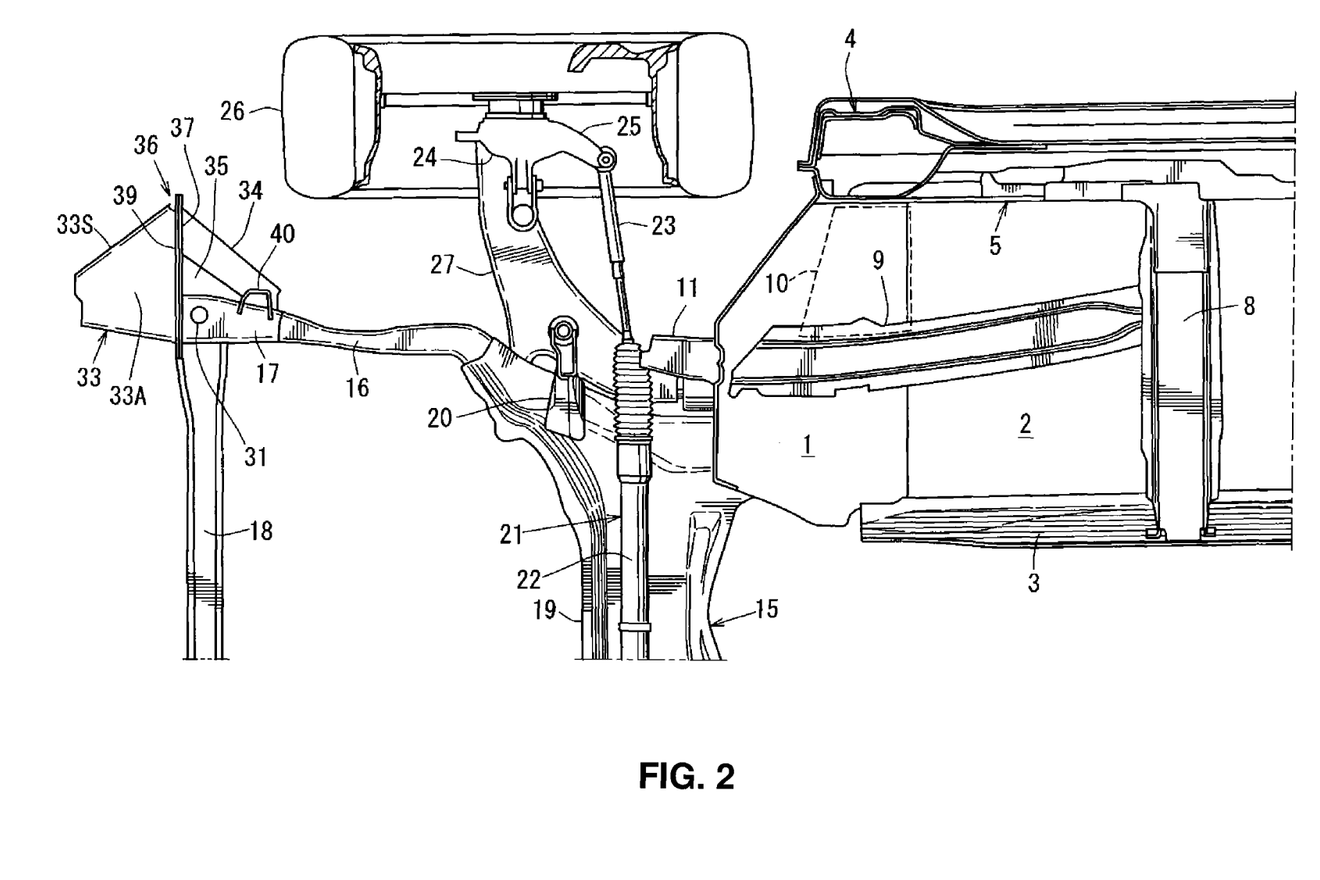
FIG. 2 is a plan view of the vehicle-body structure shown in FIG. 1, in which an apron reinforcement, a side frame, and a door are removed.

An embodiment of the present invention will be described referring to the drawings. The drawings show a vehicle-body of an automotive vehicle. FIG. 1 is a plan view of the vehicle-body structure of the automotive vehicle of the present invention, and FIG. 2 is a plan view of the vehicle-body structure shown in FIG. 1, in which an apron reinforcement, a side frame, and a door are removed. Herein, the present embodiment exemplifies a front vehicle-body structure of an automotive vehicle as the vehicle-body structure of the automotive vehicle.

In FIGS. 1 and 2, a dash lower panel (dash panel) 1 which longitudinally partitions a cabin from an engine room is provided, a floor panel 2 is provided continuously from a rear end of a lower portion of the dash lower panel 1, and a tunnel portion 3 which protrudes toward an inside of the cabin and extends in a vehicle longitudinal direction is provided integrally at a central portion, in a vehicle width direction, of the floor panel 2.

Further, a pair of hinge pillars 4, each of which has a vertically-extending closed cross section, are provided at both-side end portions, in the vehicle width direction, of the dash lower panel 1 are provided, and a pair of side sills 5, each of which has a longitudinally-extending closed cross section, are provided at both-side end portions, in the vehicle width direction, of the floor panel 2. Herein, the right-side hinge pillar 4 and the right-side side sill 5 are illustrated in FIGS. 1 and 2 only.

A front door 7 is pivotally supported at the above-described hinge pillar 4 via a hinge bracket 6 so as to open or close, a cross member 8 (a so-called No. 2 cross member) which extends in the vehicle width direction is attached to a position between the side sill 5 and the tunnel portion 3, which corresponds to a central position, in the vehicle longitudinal direction, between the hinge pillar 4 and a center pillar, not illustrated, and a closed cross section which extends in the vehicle width direction is formed between the cross member 8 and the floor panel 2.

Moreover, as shown in FIGS. 1 and 2, a floor frame 9 which extends in the vehicle longitudinal direction is provided to extend over the dash lower panel 1 and the floor panel 2, so that a closed cross section extending in the vehicle longitudinal direction is formed by the floor frame 9, the dash panel 1, and the floor panel 2.

A torque box 10 which connects the hinge pillar 4 and the floor frame 9 in the vehicle width direction is provided below the dash lower panel 1 as shown in FIG. 2.

As shown in FIG. 1, a pair of font side frames 11, each of which has a closed cross section extending in the vehicle longitudinal direction (the right-side front side frame 11, illustrated only in the figure), are provided at both sides of the engine room. A bumper reinforcement (not illustrated) which extends in the vehicle width direction is attached to the right-and-left front side frames 11 via a set plate, an attaching plate, and a main crash can.

As shown in FIG. 1, an apron reinforcement 12 which has a closed cross section extending in the vehicle longitudinal direction is provided above and on outward side, in the vehicle width direction, of the front side frame 11, and also a wheel house 13 and a suspension tower portion 14 are formed between the apron reinforcement 12 and the front side frame 11.

A sub frame 15 which mounts a powertrain (not illustrated) is provided at a lower portion of the front side frames 11 as shown in FIGS. 1 and 2.

The sub frame 15 is a frame member which is formed in a frame shape in a plan view by a longitudinal member 16 and a tip member 17 which continuously extend in the vehicle longitudinal direction at each of its right-and-left both sides, a front cross member 18 which extends in the vehicle width direction at its front side, and a rear cross member 19 which extends in the vehicle width direction at its rear side.

Herein, the above-described tip member 17 is configured to have a higher rigidity than the above-described longitudinal member 16. Further, the front cross member 18 serves as a shroud lower as well, and is formed in a hat shape in a side view.

As shown in FIGS. 1 and 2, at an end portion, in the vehicle width direction, of the rear cross member 19 of the sub frame 15 is provided a tower portion 20 which rises upward from the rear cross member 19, and the sub frame 15 is attached to the lower portion of the front side frame 11 via the above-descried tower portion 20.

As shown in FIG. 2, a steering device 21 is configured such that a pair of control links 23 are provided at both-side ends (a right end is illustrated in FIG. 2 only) of a rack portion 22 and a front wheel 26 is steered by a knuckle arm 25 of a steering knuckle 24 to which the control link 23 is coupled. In FIG. 2, reference character 27 denotes a lower arm of a front suspension. Herein, the front vehicle-body structure of the automotive vehicle of the illustrated embodiment is configured to be substantially symmetrical.

Figure 3:
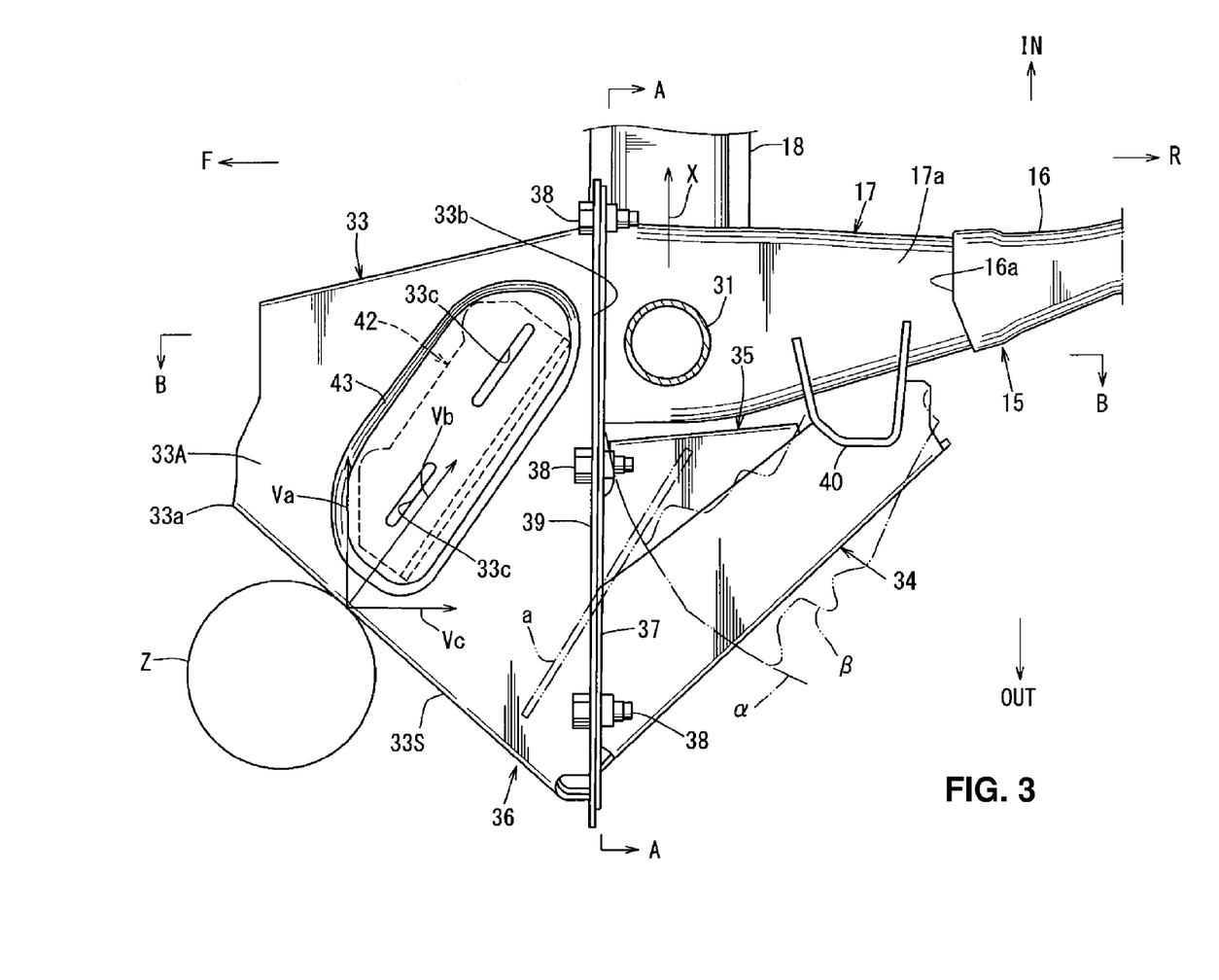
FIG. 3 is an enlarged plan view of a left-side major part of the vehicle-body structure.
Figure 4:
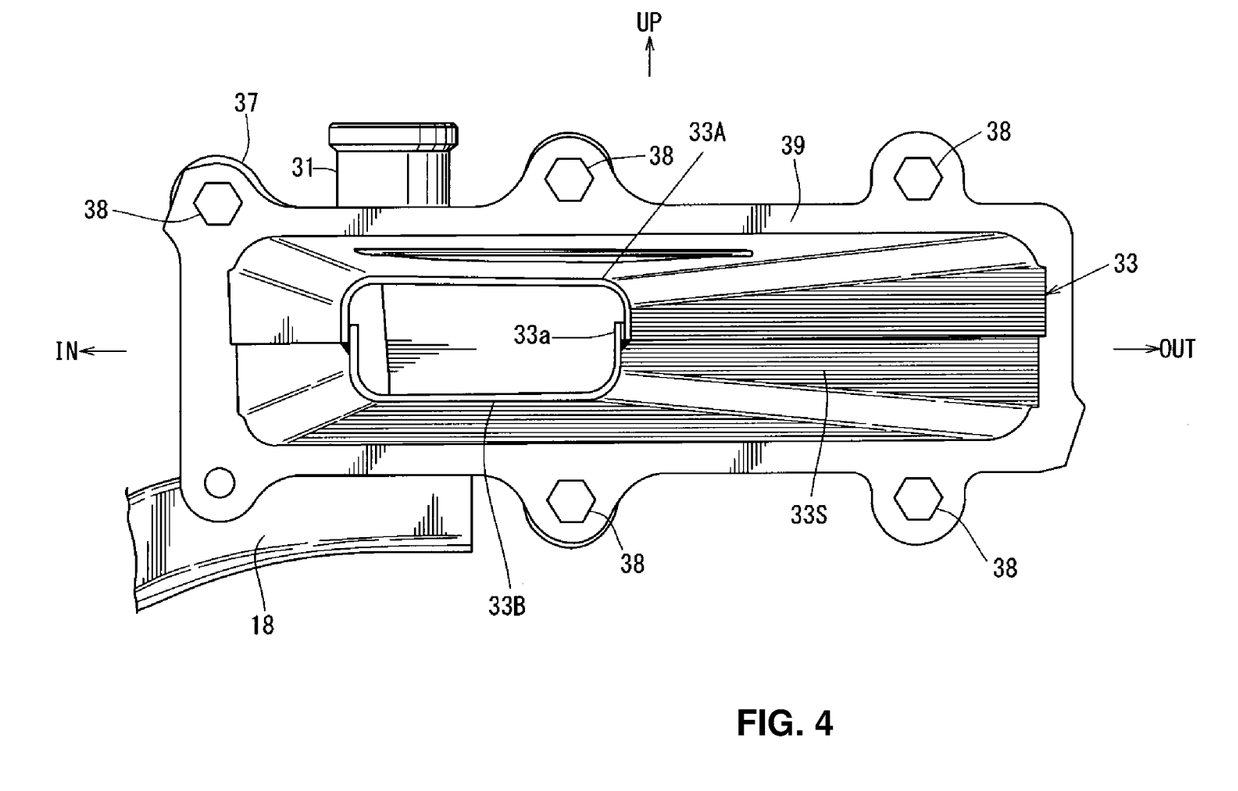
FIG. 4 is a major-part plan view of FIG. 3.
Figure 5:
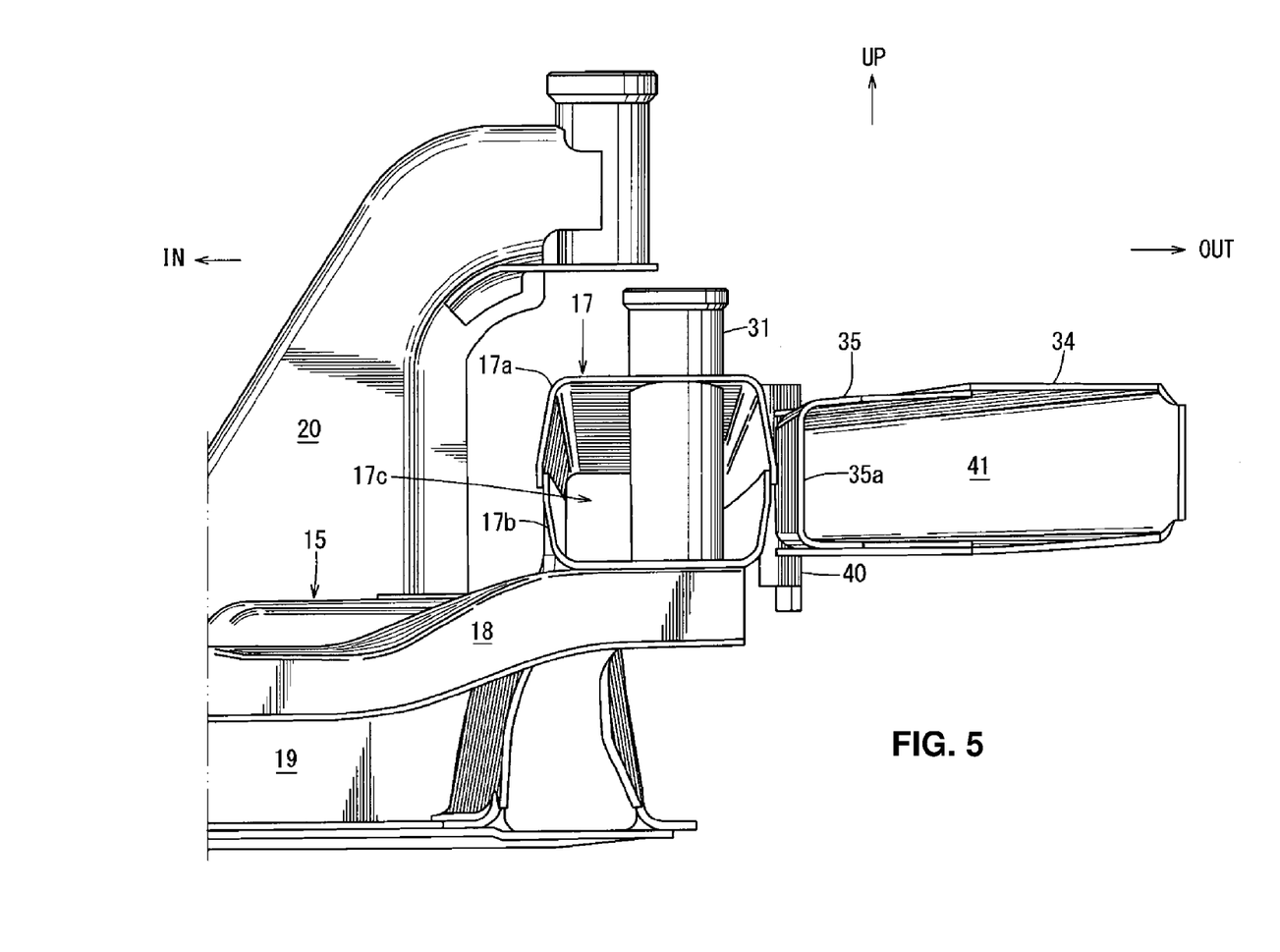
FIG. 5 is a view taken along line A-A of FIG. 3.
Figure 6:
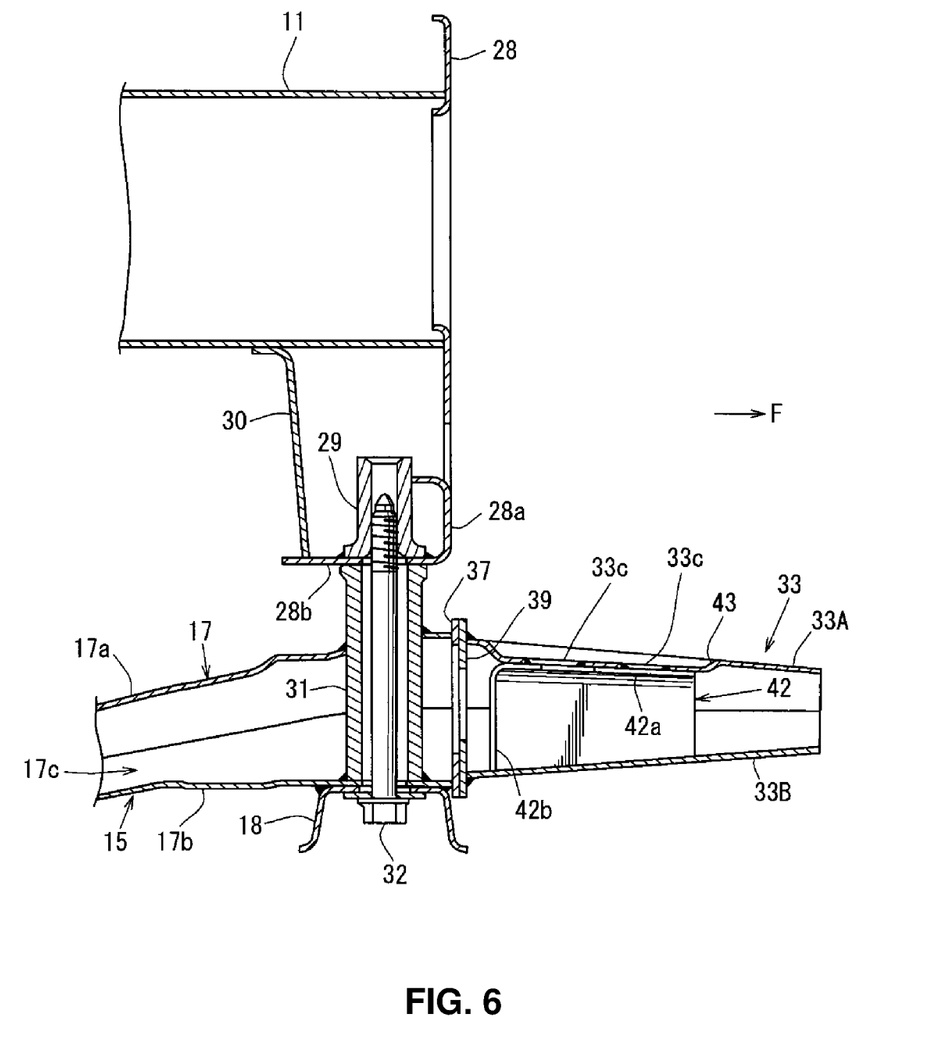
FIG. 6 is a sectional view taken along line B-B of FIG. 3.
Figure 7:
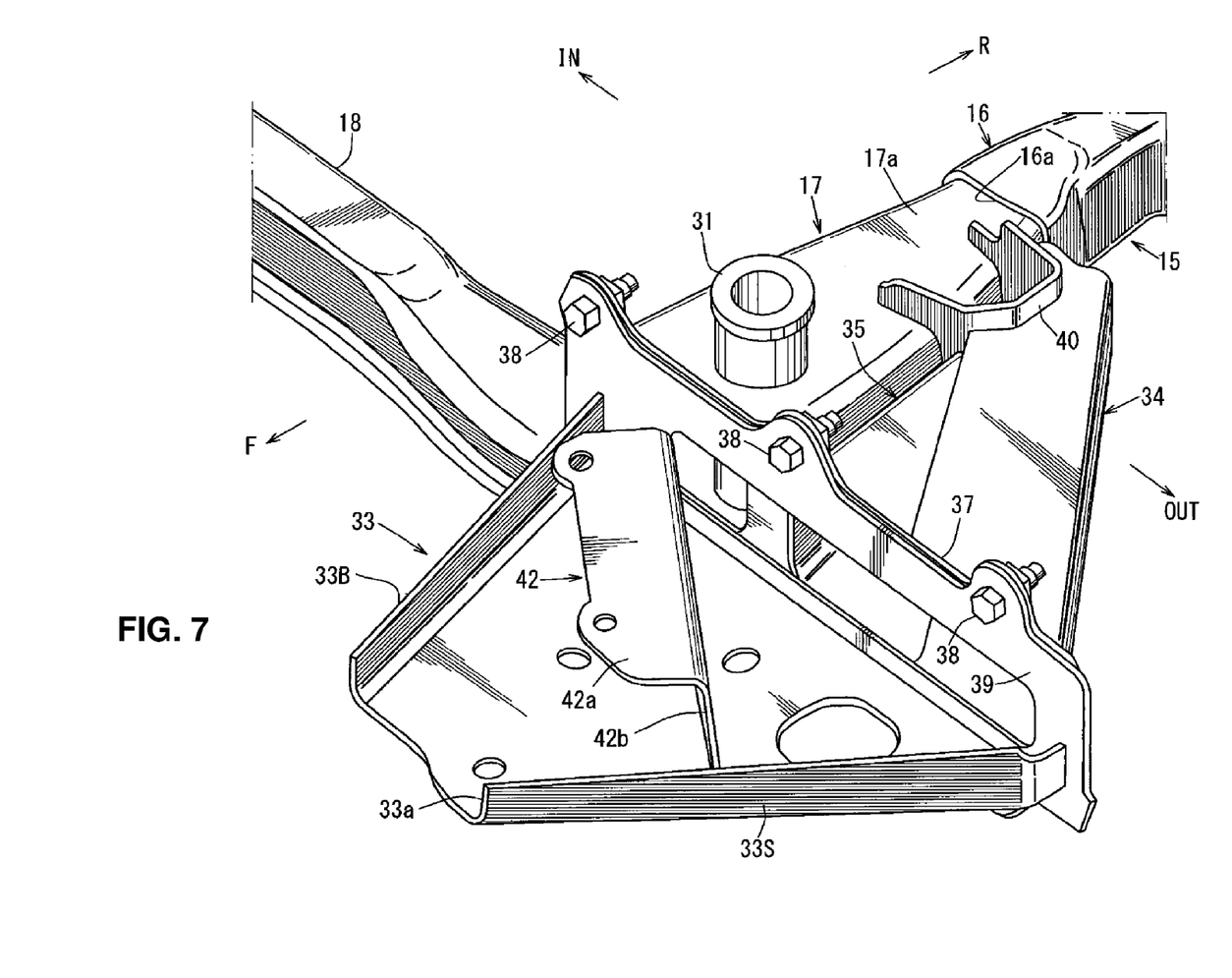
FIG. 7 is a perspective view of FIG. 3.
Figure 8:
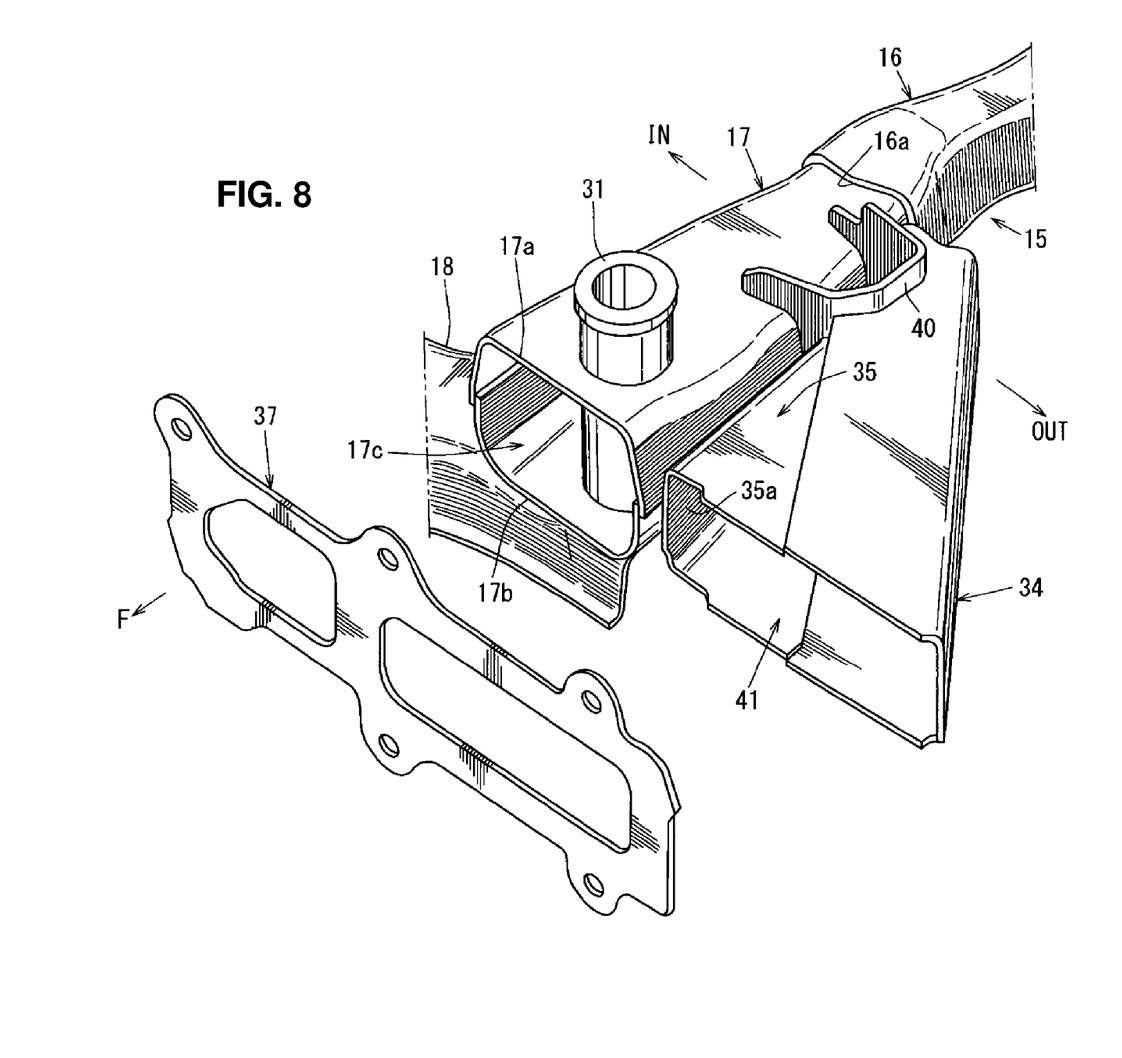
FIG. 8 is a major-part exploded perspective view of FIG. 7.

FIG. 3 is an enlarged plan view of the left-side major part of the vehicle-body structure, FIG. 4 is a major-part plan view of FIG. 3, FIG. 5 is a view taken along line A-A of FIG. 3, FIG. 6 is a sectional view taken along line B-B of FIG. 3, FIG. 7 is a perspective view of FIG. 3, and FIG. 8 is a major-part exploded perspective view of FIG. 7.

As shown in FIG. 6, a set plate 28 is attached to a front end portion of the front side frame 11. An extension portion 28a which extends downward is provided at this set plate 28, and a nut-attachment seat 28b which extends rearward from a lower end of this extension portion 28a is provided. A nut 29 is fixedly welded to an upper face of this nut-attachment seat 28b. The above-described nut-attachment seat 28b and the lower portion of the front side frame 11 are vertically connected by a sub frame attaching bracket 30.

As shown in FIG. 6, the tip member 17 of the sub frame 15 comprises an upper member 17a which has a U-shaped cross section opening downward in a front view and a lower member 17b which has a U-shaped cross section opening upward in the front view, which are combined together to form a closed cross section 17c. A connecting pipe 31 as a sub-frame connection portion which extends upward, penetrating the above-described closed cross section 17c, is fixedly welded to a front portion of the tip member 17.

Further, as shown in FIG. 6, the front cross member 18 is made to contact a lower portion of the tip member 17, the front cross member 18 is attached to the lower portion of the tip member 17 by using a long bolt 32 which is inserted into the connecting pipe 31 from below and fastened to a nut 29, and the tip member 17 is attached to the front side frame 11.

That is, as shown in FIGS. 1 and 2, the right-and-left front side frames 11, 11 are interconnected in the vehicle width direction by the sub frame 15, especially the front and rear cross members 18, 19 of the sub frame 15.

As shown in FIG. 3, at a front end portion as a tip portion of the sub frame 15 is provided a load absorption portion 36 which comprises a sub crash can 33, a branch member 34, and a U-shaped member 35 as a vehicle-width-direction load absorption portion. Specifically, as shown in FIG. 3, to a tip of the tip member 17 is attached a set plate 37 which includes this tip of the tip member 17 and protrudes outward in the vehicle width direction, and an attaching plate 39 is attached to a front face of the set plate 37 with plural bolts and nuts 38.

As shown in FIGS. 3 and 7, a vehicle-width-direction length of the attaching plate 39 is set to be almost equal to that of the set plate 37, and a vertical height of the attaching plate 39 is set to be almost equal to that of the set plate 37.

Further, as shown in FIGS. 4 and 7, a base portion, i.e., a rear end portion of the sub crash can 33 which has a closed cross section which is formed by an upper panel 33A which has a U-shaped cross section opening downward in the front view and a lower panel 33B which has a U-shaped cross section opening upward in the front view is fixedly welded to a front face of the above-described attaching plate 39.

As shown in FIGS. 3, 7 and 8, a branch member joint bracket 40 which is of a U shape in the plan view is attached to a middle portion between the connecting pipe 31 and a front end 16a of the longitudinal member 16 which is located on the outward side, in the vehicle width direction, of the tip member 17.

As shown in FIGS. 7 and 8, the above-described branch member 34 is configured to have a U-shaped cross section opening inward, and extends from the branch member joint bracket 40 to an extension-side back face of the set plate 37 and is fixedly joined to these members 40, 37. That is, the branch member 34 extends obliquely outward and forward from the tip member 17.

Herein, a front end of the branch member 34 and the tip member 17 which is a tip of the sub frame 15 are connected by the set plate 37 which is a connection portion, and the set plate 37 and the attaching plate 39 are configured to be deformable in the vehicle width direction when receiving an input load of the small overlap collision.

As shown in FIGS. 7 and 8, the above-described U-shaped member 35 has a U-shaped cross section opening outward, and this U-shaped member 35 is, as shown in FIGS. 3, 7 and 8, provided separately from the tip member 17 on a frame side of a middle portion, in the vehicle longitudinal direction, of the branch member 34, i.e., on the side of the tip member 17 of the sub frame 15 so that the load can be absorbed in the vehicle width direction by the U-shaped member 35.

The sub crash can 33 which constitutes the load absorption portion 36 together with the branch member 34 and the U-shaped member 35 is configured as shown in FIG. 3 to protrude forward from a front face of the tip member 17 beyond this tip member 17 and extend outward. This sub crash can 33 includes an inclination face portion 33S which protrudes outward beyond the tip member 17 and a tip face 33a of which extends obliquely forward and inward.

Since the sub crash can 33 includes the inclination face portion 33S described above, when the vehicle has the small overlap collision in which a collision object Z (see FIG. 3) cannot be received at the front face of the front side frame 11, the collision object Z is received at the inclination face portion 33S, so that a lateral-slide load X is generated at the same time as the load absorption deformation of the sub crash can 33, thereby suppressing improper deformation of the vehicle body, preventing weight increasing.

As shown in FIG. 3, the input load from the collision object Z in the small overlap collision can be decomposed into a lateral-slide load vector Va, a load absorption vector Vb, and a rear vector Vc. The lateral-slide load X is transmitted to the front side frame 11 through the connecting pipe 31 and also transmitted to the opposite-side front side frame 11 through the front cross member 18. Thus, the load can be dispersed to an entire part of the vehicle body, so that the lateral-slide load can be generated surely.

Herein, since an outward end portion, in the vehicle width direction, of the load absorption portion 36 is set on the outward side relative to the gravity center of the vehicle, the rotational moment can be properly generated in order to control the vehicle body to be displaced having the lateral slide as well.

Further, as shown in FIG. 3, the sub crash can 33 constituting the load absorption portion 36 protrudes forward relative to the tip member 17 of the sub frame 15, and is configured such that its edge which is positioned at the sub-frame front face of the tip member 17, that is—a front edge 33b which is positioned at the front face of the tip member 17 extends substantially in the vehicle width direction. Herein, the front edge 33b positioned at the front face of the tip member 17 may be configured to extend obliquely forward and outward.

Accordingly, when the collision object Z hits against the front face of the sub frame 15 (i.e., in the vehicle frontal or rear collision, not the small overlap collision), the load absorption is achieved surely without making the collision object Z laterally slide relatively to the front face of the sub frame 15, thereby ensuring the sufficient amount of load absorption. Meanwhile, in the small overlap collision in which the collision object Z hits against the inclination face portion 33S, the lateral-slide load is generated surely. Further, since the sub crash can 33 is provided widely up to the front face of the sub frame 15, the sub crash can 33 can be properly hard to bend rearward in the small overlap collision, compared with a case in which the sub crash can is configured to extend obliquely forward and outward, so that the load absorption caused by inward buckling deformation and the lateral-slide load can be generated stably, which will be described later. Herein, it is preferable in increasing the sectional area and the amount of load absorption that the front edge 33b of the sub crash can 33 be configured to extend substantially in the vehicle width direction.

Moreover, as shown in FIG. 3, the above-described load absorption portion 36 comprises the tip-side member (the sub crash can 33) which protrudes outward relative to the tip member 17 of the tip portion of the sub frame 15 and includes the above-described inclination face portion 33S and the central-side member (the branch member 34 and the U-shaped member 35) which is positioned on a central side, in the vehicle longitudinal direction, (on a rearward side according to the present embodiment) relative to the tip-side member (the sub crash can 33), provided to protrude outward relative to the sub frame 15, and connected to the tip-side member (the sub crash can 33) so as to deform inward for load absorption in conjunction with inward deformation of the tip-side member (the sub crash can 33).

Accordingly, since the load absorption portion 36 comprises the sub crash can 33 as the tip-side member and also the branch member 34 and the U-shaped member 35 as the central-side member, the load absorption is achieved at a larger area of the sub crash can 33 in the vehicle frontal collision, so that the amount of load absorption is properly increased without increasing a burden on a vehicle-body central side, i.e., on a vehicle-body rearward side. Meanwhile, in the small overlap collision, the lateral-slide load is intensively transmitted to the tip member 17 of the frame's tip portion by the tip-side member (the sub crash can 33) and the central-side member (the branch member 34, the U-shaped member 35).

Herein, when the vehicle has the small overlap collision, in accordance with the inward deformation of the tip-side member (the sub crash can 33) caused by the above-described load absorption vector Vb, the set plate 37 deforms as shown by an imaginary line α in FIG. 3 and also the branch member 34 deforms inward as shown by an imaginary line β in FIG. 3. In this case, since the U-shaped member 35 is separated from the tip member 17, the longitudinal load is not transmitted to the tip member 17, but the lateral load, i.e., the lateral-slide load is transmitted only. Thus, the lateral-slide load is intensively transmitted to the tip member 17 as the vehicle-body front end portion and the sufficient amount of load absorption is ensured.

Further, since the above-described sub frame 15 is configured such that the right-and-left front side frames 11, 11 are interconnected by the front-and-rear cross members 18, 19 and the load absorption portion 36 is the sub crash can 33 provided at the tip portion (the tip member 17) of the sub frame 15, the lateral-slide load is generated from the moment the small overlap collision starts, without utilizing the powertrain.

Also, as shown in FIGS. 7 and 8, there is provided the branch member 34 which extends obliquely outward and forward from the tip member 17 as the tip portion of the sub frame 15 via the bracket 40, the front end of the branch member 34 and the tip member 17 as the tip portion of the sub frame 15 are connected by the set plate 37 configured to be deformable in the vehicle width direction, and there is provided the U-shaped member 35 which is positioned on the sub frame 15's side (in other words, on the inward side) of the longitudinal-middle portion of the branch member 34, separately from the tip member 17, and absorbs the load in the vehicle width direction.

Thereby, when the set plate 37 and the branch member 34 deform inward as shown by the imaginary lines α, β in FIG. 3 in the small overlap collision, the above-described U-shaped member 35 crushes at a space between the set plate 37 and the rear portion of the branch member 34, so that the amount of load absorption is increased. Also, the load is transmitted laterally and the lateral-slide load acts on the tip member 17 as the tip portion of the high-rigidity frame, so that the vehicle body is made to laterally slide relatively.

That is, the present structure is configured such that the lateral-slide load is surely generated at the high-rigidity frame tip (the tip member 17) in the small overlap collision, so that the vehicle body is properly made to laterally slide relatively. Additionally, as shown in FIGS. 3 and 7, the set plate 37 as the connection portion serves as a support portion of the sub crash can 33 as the longitudinal-load absorption member as well, so that the sub crash can 33, particularly the base portion of the sub crash can 33 is supported up to the outward side, in the vehicle width direction, of the sub frame 15.

Further, as shown in FIG. 8, the above-described branch member 34 is configured to have the U-shaped cross section opening inward and the U-shaped member 35 has the U-shaped cross section opening outward, so that a closed cross section 41 is formed by the both of the branch member 34 and the U-shaped member 35. Thus, the above-described U-shaped member 35 is provided with a contact face 35a which transmits the lateral-slide load to the tip member 17 of the sub frame 15, and also the above-described closed cross section 41 contributes to a lightweight and high-rigidity structure of the branch member 34 and the U-shaped member 35.

Moreover, as shown in FIG. 3, the U-shaped member 35 is located at a position, in the vehicle width direction, which corresponds to the connecting pipe 31 positioned in front of the vehicle-central-side connection portion, i.e., the vehicle-rear-side connection portion of the branch member 34 (see an arrangement position of the branch-member joint bracket 40) or the front cross member 18, so that the branch member 34 effectively transmits the lateral-slide load, via the bracket 40, to the front-end side of the connecting position to the tip member 17. Thus, the vehicle body is effectively made to laterally slide relatively via the connecting pipe 31 and the front cross member 18.

Meanwhile, as shown in FIGS. 3, 6 and 7, the sub crash can 33 is provided with an inclination stay 42 and an inclination bead 43, which are an inclination reinforcement portion which extends obliquely forward and outward. That is, these members 42, 43 are configured to extend forward from the tip-end side of the sub frame 15, i.e., from the front-end side of the tip member 17 and also extend outward, in the vehicle width direction, from the front-end side of the tip member 17.

As shown in FIGS. 3, 6 and 7, the inclination stay 42 is configured in an inverse-L shape, comprising a roughly-horizontal upper face portion 42a and a vertical face portion 42b which extends downward from a rear end of the upper face portion 42a. The upper panel 33A and the lower panel 33B are connected by this inclination stay 42 in a vertical direction as shown in FIG. 6.

In order to arrange the above-described inclination stay 42 inside the sub crash can 33, as shown in FIG. 3, opening portions 33c, 33c for welding are formed at the upper panel 33A along an arrangement direction of the upper face portion 42a of the inclination stay 42, and the upper face portion 42a of the inclination stay 42, the vertical face portion 42b of which has been previously fixedly welded to the lower panel 33B, is continuously welded along opening edges of the above-described opening portions 33c, 33c.

Herein, an arrangement angle of the inclination stay 42, specifically an angle between the set plate 37 and the vertical face portion 42b of the inclination stay 42 can be set at any angle such that the proof stress of the sub crash can 33 is not excessively increased in the vehicle frontal collision and the lateral-slide load is properly transmitted to the vehicle body in the small overlap collision, but it is preferable that the above-described angle be set at about 45 degrees.

Also it is preferable for improvement of the load-transmission performance that the inclination stay 42 be arranged at the right angle or nearly right angle relative to the inclination face portion 33S of the sub crash can 33. The above-described inclination bead 43 is configured to protrude downward from the horizontal face portion of the load absorption portion, especially from the upper face portion of the upper panel 33A of the sub crash can 33 in the present embodiment.

While the above-described inclination bead 43 is configured in a ring shape along a periphery of the upper face portion 43a so as not to interfere with the upper face portion 42a of the inclination stay 42 as shown in FIG. 3, at least one straight-shaped inclination bead which is configured along the vertical face portion 42b of the inclination stay 42 may be provided at the lower panel 33B of the sub crash can 33 in place of the above-described inclination bead 43.

The sub crash can 33 is provided with the inclination stay 42 and the inclination bead 43 as the inclination reinforcement portion as described above, so that increasing of the proof stress of the inclination direction (see the direction of the load absorption vector Vb shown in FIG. 3) of the sub crash can 33 in the small overlap collision is achieved, suppressing improperly-large shape changing of the sub crash can 33 and the increase of the proof stress of the vehicle longitudinal direction of the sub crash can 33. Additionally, the lateral-slide load is made to directly act on the tip member 17 as the high-rigidity frame tip portion, so that the lateral-slide load is sufficiently transmitted to the tip member 17, thereby surely making the vehicle body laterally slide relatively to the collision object Z. Meanwhile, in the normal offset collision, the collision load is received at the tip member 17 via the sub crash can 33.

Further, the upper panel 33A and the lower panel 33B of the sub crash can 33 are connected vertically by the above-described inclination stay 42, so that the lightweight and high rigidity structure is provided to the sub crash can 33. Moreover, the inclination bead 43 as the inclination reinforcement portion is relatively easily deformable against the input load from the vehicle longitudinal direction, but has the sufficient proof stress against the input load from an oblique direction in the small overlap collision, so that the oblique-direction proof stress of the sub crash can 33 is increased, whereas the increase of the longitudinal-direction proof stress of the sub crash can 33 is suppressed, thereby properly preventing the vehicle body's deformation in the light vehicle collision.

Additionally, as shown in FIG. 3, the rear sides, in the vehicle longitudinal direction, of the inclination stay 42 and the inclination bead 43 as the inclination reinforcement portion are positioned close to the connecting pipe 31 and the front cross member 18. Thereby, the lateral-slide load is effectively transmitted and dispersed to the vehicle body via the connecting pipe 31 and the front cross member 18.

In place of the structure shown in FIG. 3, the rear end side of the inclination stay may be provided to face the connecting pipe 31 and the front cross member 18 in the vehicle width direction as shown in the imaginary line α in the same figure, and the number of the inclination stay 31 is not limited to one but plural inclination stays may be provided. In the figures, an arrow F shows a vehicle font side, an arrow R shows a vehicle rear side, an arrow IN shows a vehicle inward side, an arrow OUT shows a vehicle outward side, and an arrow UP shows a vehicle upper side.

As described above, the vehicle-body structure of the automotive vehicle of the embodiment shown in FIGS. 1-8 comprises the frame (see the sub frame 15) provided at the side portion of the vehicle body to extend in the vehicle longitudinal direction, and the load absorption portion 36 provided at the tip portion (see the tip member 17) of the frame (the sub frame 15), wherein the load absorption portion 36 includes the inclination face portion 33S which protrudes outward, in the vehicle width direction, relative to the frame (the sub frame 15) and the tip face of which extends obliquely forward and inward (see FIGS. 2 and 3).

According to this structure, since the load absorption portion 36 is configured to include the above-described inclination face portion 33S, when the vehicle has the small overlap collision in which the collision object Z cannot be received at the front face of the frame (the sub frame 15), the collision object Z can be received at the inclination face portion 33S, so that the lateral-slide load can be generated at the same time as the load absorption of the load absorption portion 36, thereby suppressing improper deformation of the vehicle body, preventing weight increasing.

In the embodiment of the present invention, the load absorption portion 36, which protrudes forward relative to the tip portion (the tip member 17) of the frame (the sub frame 15), is configured such that the edge (see the front edge 33b) which is positioned at the front face of the tip portion (the tip member 17) of the frame (the sub frame 15) extends substantially in the vehicle width direction (see FIG. 3).

According to this structure, when the collision object hits against the front face of the frame (i.e., in the vehicle frontal collision, not the small overlap collision), the load absorption can be achieved surely without making the load absorption portion 36 laterally slide relatively, thereby ensuring the sufficient amount of load absorption. Meanwhile, in the small overlap collision in which the collision object hits against the inclination face portion 33S, the lateral-slide load can be generated surely.

Further, in the embodiment of the present invention, the load absorption portion 36 comprises the tip-side member (the sub crash can 33) and the central-side member (the branch member 34, the U-shaped member 35), wherein the tip-side member (the sub crash can 33) protrudes outward relative to the tip portion of the frame (the sub frame 15) and includes the inclination face portion 33S, and the central-side member (the branch member 34, the U-shaped member 35) is positioned on the central side, in the vehicle longitudinal direction, relative to the tip-side member (the sub crash can 33), provided to protrude outward relative to the frame (the sub frame 15), and connected to the tip-side member (the sub crash can 33) so as to deform inward for load absorption in conjunction with inward deformation of the tip-side member (the sub crash can 33) (see FIG. 3).

According to this structure, since the load absorption portion 36 comprises the above-described tip-side member (the sub crash can 33) and the above-described central-side member (the branch member 34, the U-shaped member 35), the load absorption is achieved at a larger area of the load absorption portion 36 in the vehicle frontal collision, so that the amount of load absorption can be properly increased without increasing a burden on the vehicle-body central side (the vehicle-body rear side in the present embodiment). Meanwhile, in the small overlap collision, the lateral-slide load can be intensively transmitted to the frame's tip portion (see the tip member 17) by the tip-side member (the sub crash can 33) and the central-side member (the branch member 34, the U-shaped member 35).

Additionally, in the embodiment of the present invention, the above-described frame is the sub frame 15 connecting the right-and-left side frames (the front side frames 11) in the vehicle width direction, and the load absorption portion is the sub crash can 33 provided at the tip portion of the sub frame 15 (see FIG. 3).

According to this structure, since the load absorption portion is the sub crash can 33 provided at the tip portion of the sub frame 15 connecting the right-and-left side frames (the front side frames 11), the lateral-slide load can be generated from the moment the small overlap collision starts, without utilizing the powertrain.

Figure 9:
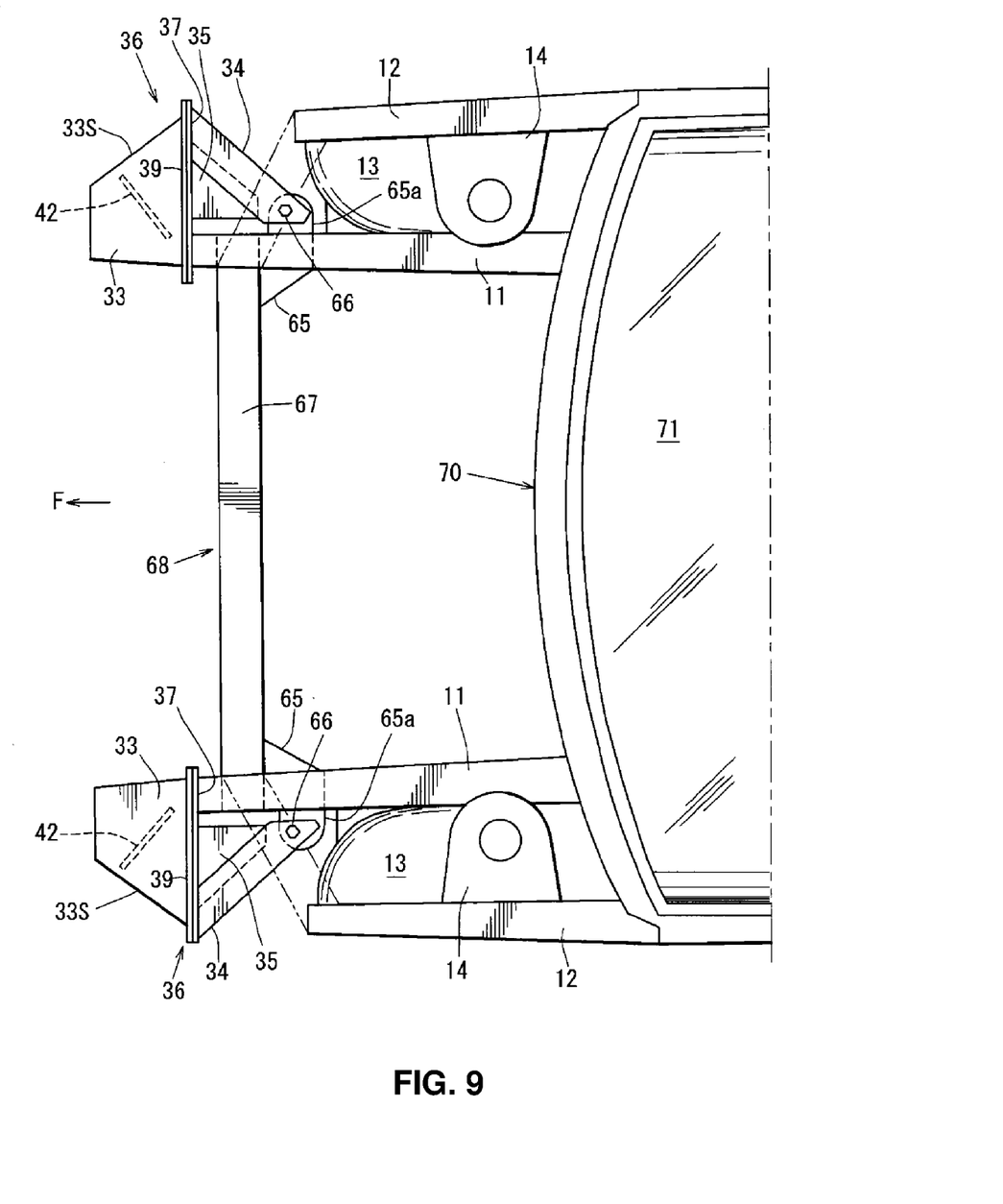
FIG. 9 is a plan view of another embodiment of the vehicle-body structure of the automotive vehicle.
Figure 10:
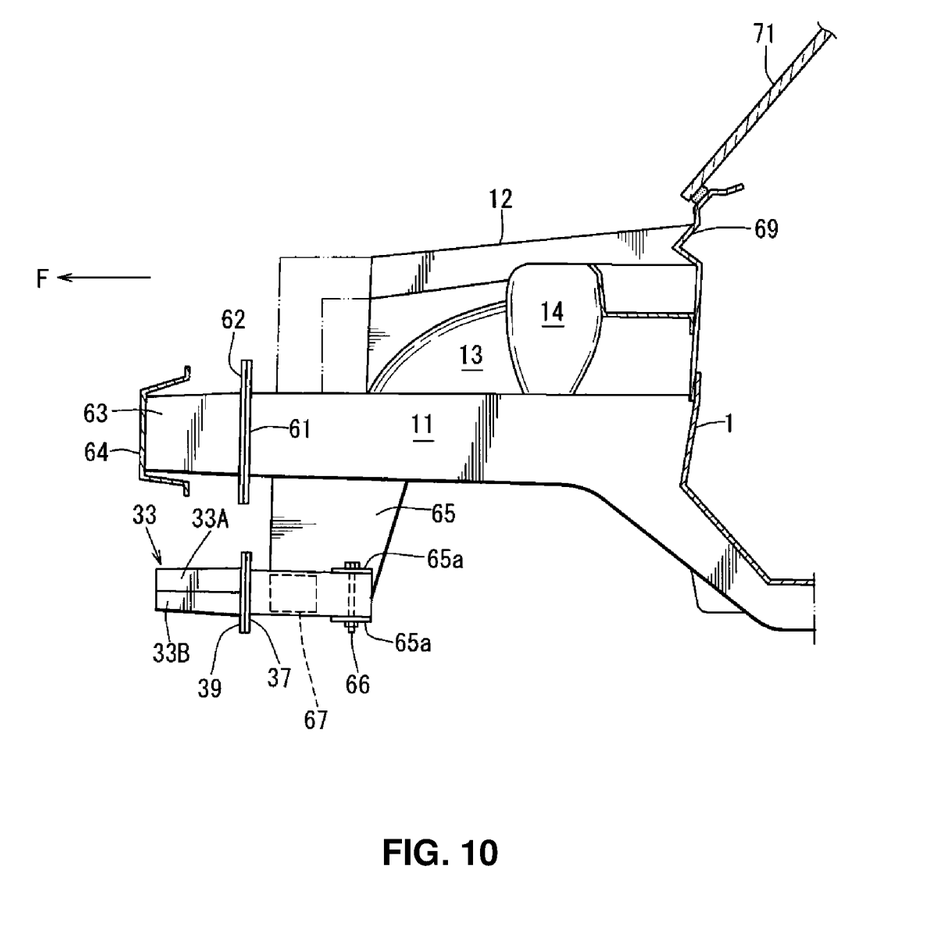
FIG. 10 is a side view of FIG. 9.

FIG. 9 is a plan view showing another embodiment of the vehicle-body structure of the automotive vehicle, and FIG. 10 is a side view of FIG. 9. Herein, FIGS. 9 and 10 exemplify the front vehicle-body structure of the automotive vehicle as the vehicle-body structure of the automotive vehicle. Further, the same portions are denoted by the same character references in these figures as well as the previous figures.

As shown in FIG. 10, a main crash can 63 is attached to the front end portion of the front side frame 11 via the set plate 61 and the attaching plate 62, and a bumper reinforcement 64 which extends in the vehicle width direction is provided between the respective front end portions of the right-and-left main crash cans 63, 63.

Further, as shown in FIG. 10, there are provided a pair of brackets 65 which extend downward from respective lower faces of the front portions of the right-and-left front side frames 11, 11, a branch member attaching piece 65a is integrally formed at each bracket 65, and a rear-end side of the branch member 34 is fixedly fastened to the branch member attaching piece 65a by using a fastening member 66, such as a bolt and nut.

Moreover, as shown in FIG. 9, a shroud lower 67 which extends in the vehicle width direction is provided to extend between respective lower portions of the pair of right-and-left brackets 65, 65.

As shown in FIG. 9, the above-descried pair of right-and-left front side frames 11, 11 are interconnected by a shroud portion 68 which includes the shroud lower 67 and the pair of brackets 65, 65, and the rear side of the inclination stay 42 as the inclination reinforcement portion is provided close to an end portion, in the vehicle width direction, of the above-described shroud lower 67.

Also, as shown in FIGS. 9 and 10, the sub crash can 33 is attached to the front end portions of the above-described branch member 34 and U-shaped member 35 via the set plate 37 and the attaching plate 39.

As described above, the rear side of the inclination stay 42 is provided close to the shroud lower 67, so that the lateral-slide load is effectively transmitted and dispersed to the vehicle-body front portion via the shroud lower 67. In FIGS. 9 and 10, reference character 69 denotes a dash upper panel, reference character 70 denotes a front cowl portion, and reference character 71 denotes a windshield glass.

In comparison between the present invention and the above-described embodiments, the frame of the invention corresponds to the sub frame 15 or the front side frame 11 (another embodiment) of the embodiments. Likewise, the tip portion of the frame corresponds to the tip member 17 or the bracket 65 (another embodiment), the tip-side member corresponds to the sub crash can 33, the central-side member corresponds to the branch member 34 and the U-shaped member 35, the side frame corresponds to the front side frame 11, the connection portion corresponds to the set plate 37, and the inclination reinforcement portion corresponds to the inclination stay 42 and the inclination bead 43. However, the present invention is not to be limited to the above-described embodiments. For example, while the above-described embodiments exemplify the front vehicle-body structure of the automotive vehicle, the vehicle-body structure of the automotive vehicle of the present invention is applicable to a rear vehicle-body structure of the automotive vehicle.

What is claimed is:

1. A vehicle-body structure of an automotive vehicle, comprising:
    a frame provided at a side portion of a vehicle body to extend in a vehicle longitudinal direction;
    a front cross member connected to the frame at a tip portion of the frame and the cross member extending in a vehicle width direction; and
    a load absorption portion provided at a front face of the tip portion of the frame to protrude forward,
    wherein said load absorption portion includes an inclination face portion, said load absorption portion protrudes outward from the frame, in the vehicle width direction, relative to said frame and a tip face of the inclination face portion extends obliquely forward and inward.

2. The vehicle-body structure of the automotive vehicle of claim 1, wherein said load absorption portion, which protrudes forward relative to said tip portion of the frame, is configured such that an edge thereof which is positioned at the front face of the tip portion of the frame extends substantially in the vehicle width direction or obliquely forward and outward.

3. The vehicle-body structure of the automotive vehicle of claim 2, wherein said load absorption portion comprises a tip-side member and a central-side member, the tip-side member protruding outward relative to said tip portion of the frame and including said inclination face portion, the central-side member being positioned on a central side, in the vehicle longitudinal direction, relative to said tip-side member, provided to protrude outward relative to said frame, and connected to said tip-side member so as to deform inward for load absorption in conjunction with inward deformation of the tip-side member.

4. The vehicle-body structure of the automotive vehicle of claim 3, wherein said frame is a sub frame connecting right-and-left side frames in the vehicle width direction, and said tip-side member is a sub crash can provided at a tip portion of said sub frame.

5. The vehicle-body structure of the automotive vehicle of claim 3, wherein said central-side member comprises a branch member and a vehicle-width-direction load absorption portion, a tip of said branch member and the tip portion of said frame are connected by a connection portion which is deformable in the vehicle width direction, and said vehicle-width-direction load absorption portion is provided separately from the frame on a frame side of a middle portion, in the vehicle longitudinal direction, of the branch member so as to deform in the vehicle width direction for load absorption.

6. The vehicle-body structure of the automotive vehicle of claim 5, wherein said branch member is configured to have a U-shaped cross section opening inward, said vehicle-width-direction load absorption portion is configured to have a U-shaped cross section opening outward, and a closed cross section is formed by the branch member and the vehicle-width-direction load absorption portion.

7. The vehicle-body structure of the automotive vehicle of claim 5, wherein said frame is a sub frame which comprises a cross member portion interconnecting right-and-left side frames in the vehicle width direction, and said vehicle-width-direction load absorption portion is located at a position, in the vehicle width direction, which corresponds to at least one of a side-frame connection portion positioned in front of a vehicle-central-side connection portion of said branch member and said cross member portion.

8. The vehicle-body structure of the automotive vehicle of claim 2, wherein said load absorption portion is provided with an inclination reinforcement portion which is configured to obliquely extend forward and outward from a tip-end side of the frame.

9. The vehicle-body structure of the automotive vehicle of claim 8, wherein said tipside member comprises an upper panel and a lower panel, and said inclination reinforcement portion comprises an inclination stay which connects said upper and lower panels in a vertical direction.

10. The vehicle-body structure of the automotive vehicle of claim 8, wherein said tip-side member has an upper face portion, and said inclination reinforcement portion comprises an inclination bead which is formed at said upper face portion of the tip-side member.

11. The vehicle-body structure of the automotive vehicle of claim 8, wherein said frame is a sub frame which comprises a cross member portion interconnecting right-and-left side frames in the vehicle width direction, and a rear side, in the vehicle longitudinal direction, of said inclination reinforcement is located at a position, in the vehicle width direction, which corresponds to at least one of a side-frame connection portion and said cross member portion or at a position which is close to said at least one of the side-frame connection portion and the cross member portion.

12. The vehicle-body structure of the automotive vehicle of claim 8, wherein said frame is one of a pair of right-and-left front side frames which are interconnected by a shroud portion which includes a shroud lower and a pair of right-and-left brackets, said tip portion of the frame where said load absorption portion is provided to protrude forward is one of said brackets which are provided to extend downward from respective lower faces of respective front portions of said front side frames, and a rear side, in the vehicle longitudinal direction, of said inclination reinforcement is located at a position, in the vehicle width direction, which corresponds to said shroud lower or at a position which is close to the shroud lower.

13. The vehicle-body structure of the automotive vehicle of claim 1, wherein said central-side member comprises a branch member and a vehicle-width-direction load absorption portion, a tip of said branch member and the tip portion of said frame are connected by a connection portion which is deformable in the vehicle width direction, and said vehicle-width-direction load absorption portion is provided separately from the frame on a frame side of a middle portion, in the vehicle longitudinal direction, of the branch member so as to deform in the vehicle width direction for load absorption.

14. The vehicle-body structure of the automotive vehicle of claim 1, wherein said load absorption portion is provided with an inclination reinforcement portion which is configured to obliquely extend forward and outward from a tip-end side of the frame.

15. The vehicle-body structure of the automotive vehicle of claim 1, wherein said load absorption portion includes a member which comprises an upper panel and a lower panel and is of a tubal shape extending longitudinally.

* * * * *